United States Patent Office 3,650,995
Patented Mar. 21, 1972

3,650,995
SHAPED ARTICLES OF LATEX FOAM
Robert E. Erickson, Midland, Mich., assignor to The
Dow Chemical Company, Midland, Mich.
No Drawing. Filed Oct. 7, 1968, Ser. No. 765,628
Int. Cl. C08f 47/08; B29d 27/00
U.S. Cl. 260—2.5 L
9 Claims

ABSTRACT OF THE DISCLOSURE

Shaped foam articles of the reactive latexes are readily prepared by casting the latex in the form of a wet froth comprising a polymer having certain reactive substituent groups such as carboxy and a water-dispersible coreactive material such as a melamine-formaldehyde condensate onto a porous mold and curing and drying the wet froth with an air circulating drying means.

BACKGROUND OF THE INVENTION

This invention relates to making shaped articles of latex foam from a wet froth of the latex, and more particularly, to a method for molding foams of the reactive latexes which are not conveniently molded by conventional closed mold techniques.

Molded foams of the natural and non-reactive synthetic rubber latexes are usually prepared by a method described in Madge, E. W., "Latex Foam Rubber," Chap. 7, Wiley & Sons, New York (1962), wherein a wet froth of the latex containing conventional gelling and vulcanizing agents is introduced into a closed metal mold, then gelled and subsequently vulcanized, often with steam. The foam article is then stripped from the closed mold, washed and dried. This method is somewhat undesirable for preparing natural and nonreactive synthetic latex foams because of the expense of the closed metal molds, the necessity for coagulating and vulcanizing agents, and the long curing and drying time requirements. According to an improved method described in U.S. Pat. 3,243,491, latex foams may be molded by (1) casting a wet froth of the latex containing conventional gelling and vulcanizing agents onto a porous mold precoated with a latex coagulating agent and a lubricant, (2) curing the wet froth with steam, and (3) stripping the cured foam from the porous mold. The use of a porous mold in the steaming process is said to reduce the curing time. Unfortunately, the polymers which may be cured by the methods requiring steam curing, whether carried out in a porous or a closed surface mold, are limited almost exclusively to natural rubber, to certain polymers of 2-chloro-1,3-butadiene, to the acrylonitrile-butadiene rubbers, and to the GRS cold rubbers. This limitation results primarily from the requirements of high solids concentration and early development of strength in the wet coagulated foam.

Foams of the reactive latexes, i.e., latexes of polymers having certain reactive substituent groups, have better initial color, better non-staining features, better resistance to color change and aging than do the conventional rubber latex foams. For these reasons the reactive latexes are often preferred by the latex foam industry.

Latex foams prepared from reactive latexes and coreactive materials but not requiring conventional gelling and vulcanizing agents have been described in U.S. Pat. 3,215,-647. While preparation of foams using a closed mold is referred to therein, the part of the process related to molding is similar to that developed earlier for natural rubber latex foams in which the wet froth is stripped from the mold before curing and drying are completed. At that stage of the process, the wet froth is in a somewhat fragile, gelatinous state.

In light of the present problems in preparing shaped foam articles of the reactive latexes, it would be highly desirable to provide a method wherein the latex foam is cured and dried in a single step, and it is not necessary to strip the foamed article from the shaping mold until the foam is finally cured.

SUMMARY OF THE INVENTION

It is therefore an object of this invention to provide such a new and advantageous method for molding reactive latex foams. Another object is to provide a method requiring relatively inexpensive molds. A further object is to provide a method wherein it is not necessary to add coagulating or vulcanizing agents to the wet froth or to coat the mold with such materials. Other objects and advantages of this invention will become apparent in the following summary and description of the preferred embodiments.

The objects of this invention have been attained by the method, hereinafter described in detail, comprising the steps of (1) casting a wet froth of an aqueous colloidal dispersion comprising a latex polymer having at least one pendant reactive substituent group and intimately admixed therewith a water-dispersible material coreactive with the reactive groups on the latex polymer onto a porous mold having a release surface and an average pore size from about 1 mil to about 1/16 inch, (2) curing and drying the froth with an air circulating drying means, and (3) stripping the dried, cured foam from the porous mold. Wet froths of the reactive latexes are readily cured by this method to give finished molded articles of the reactive latexes. In addition it is not necessary to coat the porous mold with coagulating agent in order to prevent the latex from passing into the pores of the mold during the curing and drying step. It is thought that the bonding between the coreactive material and the reactive groups on the polymer gives the froth sufficient stability and thixotropic flow to withstand the distorting forces of the air currents.

In the practice of this invention molded articles of reactive latex foam having thicknesses up to two inches are cured and dried in the same step. Accordingly it is not necessary to handle the fragile wet gelatinous froth prior to final drying. Foamed articles prepared by this method have excellent color, elasticity, resiliency, improved softness and durability. The reactive latex foams are useful in many applications where foam rubber is desirable, e.g., pillows, mattresses, furniture cushioning, rug backing, brassieres, and the like.

DESCRIPTION OF THE PREFERRED EMBODIMENTS

The method of this invention requires a latex froth having sufficient stability and thixotropic flow characteristics such that the froth will not pass into the pores of the mold during the curing and drying step. Wet froths of blends of the reactive latexes and coreactive materials have the required stability and thixotropic flow properties.

These wet froths are prepared by frothing or foaming aqueous colloidal dispersions comprising a latex polymer having certain reactive substituent groups and intimately admixed therewith a water-dispersible coreactive material containing one or more carbon atoms and additionally which has at least two of certain substituent groups coreactive with the reactive groups on the polymer. By water-dispersible material is meant a material which is soluble in aqueous or water miscible liquid or dispersible in aqueous liquid. While the dispersion necessarily contains the reactive polymer and the coreactive material, it may also contain other components such as foam stabilizers, pH control agents, foaming aids, thickeners, mineral fillers, antioxidants and the like. Frothing or foaming of the dispersion can be accomplished by one of several known methods such as by using blowing agents, by whipping or by use of apparatus having commercially avaliable foam heads.

The reactive latex polymers suitable for use in this invention are polymers of at least two ethylenically unsaturated monomers selected from the class of styrene and monomers copolymerizable with the styrene, for example, a copolymer comprising a monovinylidene aromatic monomer, an aliphatic conjugated diene monomer having from 4 to 10 carbon atoms, and an $\alpha,\beta$-ethylenically unsaturated carboxylic acid.

At least one of such monomers which is copolymerized to form the reactive latex consists of those polymerizable, ethylenically unsaturated monomers having pendant reactive groups such as carboxy, sulfo, primary amino, secondary amino, amido, methylolamido, sulfonamido, primary hydroxyl, secondary hydroxyl, phenolic hydroxyl, aldehydic, and epoxy groups or which have substituent groups which, subsequent to polymerization, can be converted to such reactive substituent groups, e.g., ester, nitrile, amide, or salt groups which can be hydrolyzed to reactive acid, amine, or hydroxyl groups.

Examples of suitable ethylenically unsaturated monomers having pendant reactive substituent groups include acrylic acid, methacrylic acid, itaconic acid, fumaric acid, maleic acid, ethyl acid maleate, 2-sulfoethyl acrylate, 2-sulfoethyl methacrylate, 2-aminoethyl methacrylate hydrochloride, 2-aminoethyl acrylate hydrochloride, vinyl benzylamine, glycidyl methacrylate, hydroxystyrene, acrolein, methacrolein, allyl alcohol, vinylbenzyl alcohol, 2-hydroxyethyl acrylate, 2-hydroxyethyl methacrylate, acrylamide, bis-N-methylol acrylamide, N-methylolmethacrylamide, N - methylolmethacrylamide, bis-N-methlolmethacrylamide, methacrylamide, N - $\beta$ - hydroxyethyl acrylamide, N - $\beta$ - hydroxyethyl methacrylamide, $\beta$-hydroxypropyl acrylate, $\beta$-hydroxypropyl methacrylate, $\gamma$-hydroxypropyl acrylate, $\gamma$-hydroxypropyl methacrylate, 6-hydroxyhexyl acrylate, 6-hydroxyhexyl methacrylate, sodium styrene sulfonate, sodium $\alpha$-methylstyrene sulfonate, 2-methylaminoethyl acrylate hydrochloride, 2-methylaminoethyl methacrylate hydrochloride, 3-methylaminopropyl acrylate hydrochloride, 3-methylaminopropyl methacrylate hydrochloride, 3-methylaminobutyl acrylate hydrochloride, 3-methylaminobutyl methacrylate hydrochloride, 3-ethylaminopropyl acrylate hydrochloride, and styrene sulfonamide.

Among the ethylenically unsaturated monomers of the class of styrene and monomers copolymerizable with styrene are the monomers having one or more reactive substituent group listed above; the monovinylidene aromatic monomers (the styrene compounds); the derivatives of ethylenically unsaturated acids such as the acrylic esters, acrylic nitriles, maleic esters, and fumaric esters; unsaturated alcohol esters; unsaturated ketones; the conjugated olefins; and other compounds containing one or more ethylenic linkage capable of addition polymerization.

Specific examples of such ethylenically unsaturated compounds are styrene, $\alpha$-methylstyrene, ar-methylstyrene, ar-ethylstyrene, $\alpha$-ar-dimethylstyrene, ar,ar-dimethylstyrene, ar-t-butyl styrene, vinylnaphthalene, methoxystyrene, cyanostyrene, acetylstyrene, monochlorostyrene, dichlorostyrene and other halostyrenes, methyl methacrylate, ethyl acrylate, butyl acrylate, hexyl acrylate, 2-ethylhexyl acrylate, lauryl methacrylate, phenyl acrylate, acrylonitrile, methacrylonitrile, ethyl $\alpha$-chloroacrylate, diethyl maleate, polyglycol maleate, vinyl chloride, vinyl bromide, vinylidene chloride, vinylidene bromide, vinyl methyl ketone, methyl isopropenyl ketone, vinyl ethyl ester, 1,3-butadiene, isoprene and the like.

Latexes of the above polymers are prepared by copolymerizing at least two ethylenically unsaturated monomers, of the class of styrene and monomers copolymerizable with styrene, at least one of which contains a pendant substituent reactive group, by conventional emulsion polymerization methods.

The coreactive materials which are mixed with suitable reactive latex polymers are those materials which are soluble in water or in water-miscible solvents or which are water-dispersible and which contain at least one carbon atom and which have at least two substituent groups coreactive with the reactive groups on the copolymer of said latex. From about 1 to about 100 percent, based on the weight of latex polymer, of the coreactive material is employed. There may be selected as the coreactive material for use with the reactive latex component other latexes which contain polymers having a plurality of substituent groups which also are coreactive with the substituent groups on the copolymer of the said reactive latex. Representative coreactive substituent groups are (a) methylol groups when attached to a nitrogen atom, (b) modified methylol groups which have been alkylated with an alcohol having from 1 to 4 carbon atoms when such groups are attached to a nitrogen atom, (c) methylol groups when attached to the aromatic ring of a phenolic compound, (d) carboxyl groups, (e) primary amino groups, (f) secondary amino groups and (g) epoxy groups. The nitrogen atom in (a) and (b) may be a part of the main chain or ring of the compounds or polymer.

Examples of such coreactive materials are melamine, melamine-formaldehyde condensates, urea, urea-formaldehyde condensates, methylated melamine-formaldehyde condensates, methylated urea-formaldehyde condensates, butylated melamine-formaldehyde condensates, butylated urea-formaldehyde condensates phenol-formaldehyde condensates, liquid epoxy resins, ethylene diamine-formaldehyde condensates, hexamethylene diamine-formaldehyde condensates, polyethylene imine, ethylediamine, diethylene triamine, triethylene tetramine acetate, trimethylene diamine, tetramethylene diamine, hexamethylene diamine, decamethylene diamine, tetraethylene pentamine, guanidine, formoguanamine, benzoguanamine, dicyandiamide, malonic acid, succinic acid, glutaric acid, adipic acid, pimelic acid, suberic acid, azaleic acid, sebacic acid, polyacrylic acid, a latex comprising a copolymer of styrene, 1,3-butadiene and 2-aminoethyl methacrylate hydrochloride, and a latex comprising vinyl chloride, vinylidene chloride and 2-sulfoethyl methacrylate. Further description of the latex polymers, water dispersible coreactive materials and methods for the preparation thereof appears in U.S. 3,215,647, which is expressly and completely incorporated herein by reference.

Porous molds utilized in this invention are made from virtually any porous material, preferably from wire mesh or fiberglass. It is critical that the pores remain open throughout the process in order to maximize the curing and drying efficiency of the hot air currents. It is found that a foamed article prepared in a mold having a large porosity, hereinafter called open area, dries in a shorter time than one prepared in a mold having smaller open area. This is due to the increased air contact with the foamed article. Porous molds suitable for use in this invention have open areas from about 5 to about 15 percent based on the total surface area of the mold. Molds having open areas below 5 percent do not permit adequate water removal and molds having open areas above 15 usually yield shaped articles having uneven or bumpy surfaces. Another critical feature of the porosity of the molds is the size of the pores. Molds having very large pores are not capable of retaining the latex froth in the desired shape during the curing and drying step and molds having very small pores do not permit adequate removal of water.

Generally suitable pore sizes range from a minimum of about 1 mil to a maximum of about $\frac{1}{16}$ of an inch in diameter. While the actual maximum pore size varies with the stability and thixotropic flow of the froth, the maximum preferred size is from about $\frac{1}{64}$ to about $\frac{1}{32}$ inch in diameter for reactive latexes having a foam composition solids greater than about 65 weight percent. Suitable molds for the purposes of this invention are not required to be of any particular shape and may be open or closed on the top surface.

Due to the very adhesive character of the reactive latexes, it is desirable to apply a release material to the surface of the porous mold prior to casting the wet latex froth onto the mold. However, application of the release agent should be such that passage of water vapor through the pores of the mold will not be inhibited. By the term "release material" is meant a substance which, when applied in the form of a thin film to the surface of the mold, permits the easy removal or stripping of the finished article of reactive latex foam from the mold. Suitable release materials are also thermally stable at temperatures up to 400° F. and chemically inactive with all ingredients of the foam formulation. Examples of such materials are the temporary latex foam lubricants such as silicone oil; the liquid polymeric silicones, e.g., dimethyl silicone; and the commercially available aerosol mold release silicones. Preferred release materials are the more permanent ones such as the silicone resins and dispersions, the polymers and copolymers of tetrafluoroethylene, and the like. After the froth is cast onto the mold and before the heating step, it is often desirable to increase the stability of the froth by exposing the froth to infrared heat for a short period of time, usually less than one minute. This brief exposure to heat causes a flexible skin of the wet froth to form which is not disturbed by the hot forced air during the curing and drying step.

Curing and drying of the foam is carried out in an air circulating apparatus which facilitates the ready removal of water from the froth. In a preferred embodiment the apparatus is a forced hot air circulating oven.

Drying and curing temperatures utilized in this method range from just above the boiling point of water to about 400° F. Preferably the curing and drying apparatus is maintained at a temperature from about 325° to about 350° F. Actually the most critical temperature is the internal temperature of the foam as it is this temperature which determines whether the foam is cured. To cure the reactive latexes internal temperatures from about 230 to about 310° F. should be reached. Preferred internal temperature, i.e., the curing temperature, depend primarily on the particular reactive substituent on the latex polymer. For example latex polymers having carboxyl substituent groups cure at temperatures from about 280° to 300° F. whereas latex polymers having carboxyl substituent groups and hydroxyl substituent groups cure at temperatures from about 240° to 260° F. When the internal temperature of the froth reaches the cure temperature for the particular latex polymer, it is desirable to remove the cured foam from the curing and drying apparatus immediately in order to avoid degradation of the foam.

The following examples are given to more clearly illustrate the invention, not to limit its scope. Throughout this specification and claims, all parts and percentages are by weight unless otherwise indicated.

EXAMPLE 1

A wet latex foam formulation is prepared at 69 percent solids from the following ingredients:

| | Parts dry weight |
|---|---|
| Butadiene/styrene latex [a] | 100.0 |
| Melamine-formaldehyde resin [b] | 7.5 |
| Sodium lauryl sulfate | 2.0 |
| Calcium carbonate | 100.0 |
| Methyl cellulose | 0.25 |

[a] Latex of a copolymer of the following monomers in parts by weight based on the copolymer:

| | |
|---|---|
| Butadiene | 70.7 |
| Styrene | 27.5 |
| Acrylic acid | 1.25 |
| Itaconic acid | 0.55 |

[b] A water soluble mixture of partially methylated, low molecular weight melamine-formaldehyde adducts having an average of about 0.8 mole of methylol groups and about 1.8 mole of methoxymethyl groups for each mole of melamine.

The foam ingredients are thoroughly mixed after each ingredient is added. The formulation is converted into a wet froth by whipping air into the formulation using a Hobart mixer N-50 equipped with a wire whip. At this point the froth is poured onto a porous mold shaped from poly(tetrafluoroethylene) coated fiberglass (Fluorglas fabric M-384-25/1 Cadillac Plastics). The average pore size of the mold is about $\frac{1}{32}$ inch in diameter, and the mold has about 156 pores per square inch. The froth is then exposed to infrared heat for 30 seconds. After a thermocouple is inserted into the center of the froth at equal distances from the edges of the mold and from the top to bottom, the mold is placed in a hot air circulating oven preheated to 350° F. When the internal temperature of the froth, as indicated by the thermocouple, reaches 290° F., the mold is removed from the oven and the finished latex foam article is pulled from the mold. Drying times vary with the thickness of the foam, and a 1 inch thick foam requires a drying time of about 30 minutes.

EXAMPLE 2

The latex formulation of Example 1 is mixed and frothed according to the procedure of Example 1 and then cast onto a porous mold consisting of wire screen previously coated with silicone oil having a viscosity of 100 centipoises at room themperature, said coated mold having an average pore diameter of $\frac{1}{64}$ inch and about 352 pores per square inch. A curing procedure essentially according to that used in Example 1 is carried out. Drying times again vary with the thicknesses of the foam, and a 1 inch thick foam requires a drying time of about 30 minutes.

What is claimed is:

1. A process for preparing molded articles of a reactive latex foam in the absence of a coagulating agent comprising the steps of (1) casting a wet froth of an aqueous colloidal dispersion comprising a latex polymer having at least one pendant reactive substituent group and intimately admixed therewith from about 1 to about 100 percent, based on weight of said latex polymer, of a water-dispersible coreactive material containing at least one carbon atom and at least two substituent groups coreactive with the reactive groups on the polymer onto a porous mold having a release surface, said mold having an average pore diameter in the range from about 1 mil to about $\frac{1}{16}$ inch and an open area from about 5 percent to about 15 percent of the total mold surface area, (2) curing and drying the froth with an air circulating drying means, and (3) stripping the dried, cured foam from the porous mold.

2. The process according to claim 1 wherein the latex froth is exposed to infrared heat for a period up to one minute prior to the curing and drying step.

3. The process according to claim 1 wherein the curing and drying step consists of heating the wet froth such that the internal temperature of the froth is from about 230° to 310° F.

4. The process according to claim 1 wherein the air circulating drying means is a forced hot air circulating oven.

5. The process according to claim 4 wherein the oven is heated to a temperature from about 325° to about 350° F.

6. The process according to claim 1 wherein the mold has an average pore diameter from about $\frac{1}{64}$ to about $\frac{1}{32}$ inch.

7. The process according to claim 1 wherein the polymer is a copolymer comprising a monovinylidene aromatic monomer, an aliphatic conjugated diene monomer having from 4 to 10 carbon atoms, and an $\alpha,\beta$-ethylenically unsaturated carboxylic acid.

8. The process according to claim 1 wherein the coreactive material is a melamine-formaldehyde condensate.

9. The process according to claim 1 wherein the release agent is polytertafluoroethylene.

References Cited

UNITED STATES PATENTS 3,243,491  3/1966  Bethe _____ 264—330

FOREIGN PATENTS 1,023,202  3/1966  Great Britain _____ 260—2.5 L

MURRAY TILLMAN, Primary Examiner
W. J. BRIGGS, Sr., Assistant Examiner

U.S. Cl. X.R.

260—29.3, 29.4 UA, 29.6 RW, 29.6 NR, 29.6 H, 29.6 N, 29.7 NR, 29.7 W, 29.7 H, 29.7 N, 836, 844, 845